(12) United States Patent
Fritz et al.

(10) Patent No.: US 10,319,375 B2
(45) Date of Patent: Jun. 11, 2019

(54) AUDIO MESSAGE EXTRACTION

(71) Applicant: Amazon Technologies, Inc., Reno, NV (US)

(72) Inventors: Neil Christopher Fritz, Tempe, AZ (US); Lakshya Bhagat, Seattle, WA (US); Scott Southwood, Seattle, WA (US); Katelyn Doran, Seattle, WA (US); Brett Lounsbury, Phoenix, AZ (US); Christo Frank Devaraj, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/392,291

(22) Filed: Dec. 28, 2016

(65) Prior Publication Data
US 2018/0182380 A1 Jun. 28, 2018

(51) Int. Cl.
| | | |
|---|---|---|
| *G10L 15/00* | (2013.01) | |
| *G10L 15/18* | (2013.01) | |
| *G10L 15/30* | (2013.01) | |
| *G06F 17/27* | (2006.01) | |
| *H04W 4/12* | (2009.01) | |
| *H04M 7/00* | (2006.01) | |
| *G10L 15/22* | (2006.01) | |
| *G10L 15/08* | (2006.01) | |

(52) U.S. Cl.
CPC ........ *G10L 15/1815* (2013.01); *G06F 17/278* (2013.01); *G10L 15/1822* (2013.01); *G10L 15/22* (2013.01); *G10L 15/30* (2013.01); *H04M 7/0042* (2013.01); *H04W 4/12* (2013.01); *G10L 2015/088* (2013.01)

(58) Field of Classification Search
CPC ............................... G10L 15/22; H04M 3/533
USPC .......................................................... 704/275
See application file for complete search history.

(56) References Cited

U.S. PATENT DOCUMENTS

| | | | | |
|---|---|---|---|---|
| 8,731,146 B2 * | 5/2014 | Moore | ..................... | G10L 17/22 379/167.08 |
| 2002/0138468 A1 * | 9/2002 | Kermani | ............ | G06F 17/30017 |
| 2008/0045256 A1 * | 2/2008 | Wang | ....................... | H04W 4/16 455/518 |
| 2009/0209275 A1 * | 8/2009 | Moraes | ................... | H04L 51/00 455/466 |
| 2011/0172989 A1 * | 7/2011 | Moraes | ................ | G06Q 10/107 704/9 |

(Continued)

OTHER PUBLICATIONS

U.S. Appl. No. 15/196,228.
U.S. Appl. No. 15/254,359.

*Primary Examiner* — Daniel Abebe
(74) *Attorney, Agent, or Firm* — Hogan Lovells US LLP

(57) ABSTRACT

Audio data, corresponding to an utterance spoken by a person within a detection range of a voice communications device, can include an audio message portion. The audio data can be captured and analyzed to determine the intent to send a message. Based at least in part upon that intent, a remaining portion of the audio data can be analyzed to determine the intended message target or recipient, as well as the portion corresponding to the actual message payload. Once determined, the audio file can be trimmed to the message payload, and the message payload of the audio data can be delivered as an audio message to the target recipient.

19 Claims, 8 Drawing Sheets

(56) References Cited

U.S. PATENT DOCUMENTS

| | | | | |
|---|---|---|---|---|
| 2014/0214429 A1* | 7/2014 | Pantel | ............... | G10L 21/16 704/275 |
| 2015/0073802 A1* | 3/2015 | Meisel | ............... | G10L 15/22 704/251 |
| 2016/0155443 A1* | 6/2016 | Khan | ............... | G06F 1/3203 704/275 |

* cited by examiner

AUDIO MESSAGE EXTRACTION

BACKGROUND

As electronic devices become increasingly sophisticated, people are using such devices in new and interesting ways. Some of these devices have adopted voice control where the device can perform various actions in response to a spoken question or instruction. For example, in response to a spoken question or instruction, these devices can analyze the voice data to determine an appropriate response. In many cases, however, the functionality is limited and only certain types of tasks can be performed.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to managing communications in a networked environment. In particular, various approaches provide for the determination and extraction of an audio message received with captured audio data. The audio data can include a representation of an utterance spoken by a person within a detection range of a voice communications device. The audio data can be captured and analyzed to determine the intent to send a message. Based at least in part upon that intent, a remaining portion of the audio data can be analyzed to determine the intended message target or recipient, as well as the portion corresponding to the actual message payload. Once determined, the audio file can be trimmed to the message payload, and the message payload of the audio data can be delivered as an audio message to the target recipient.

Various other functions can be implemented within the various embodiments as well as discussed and suggested elsewhere herein.

Figure 1:
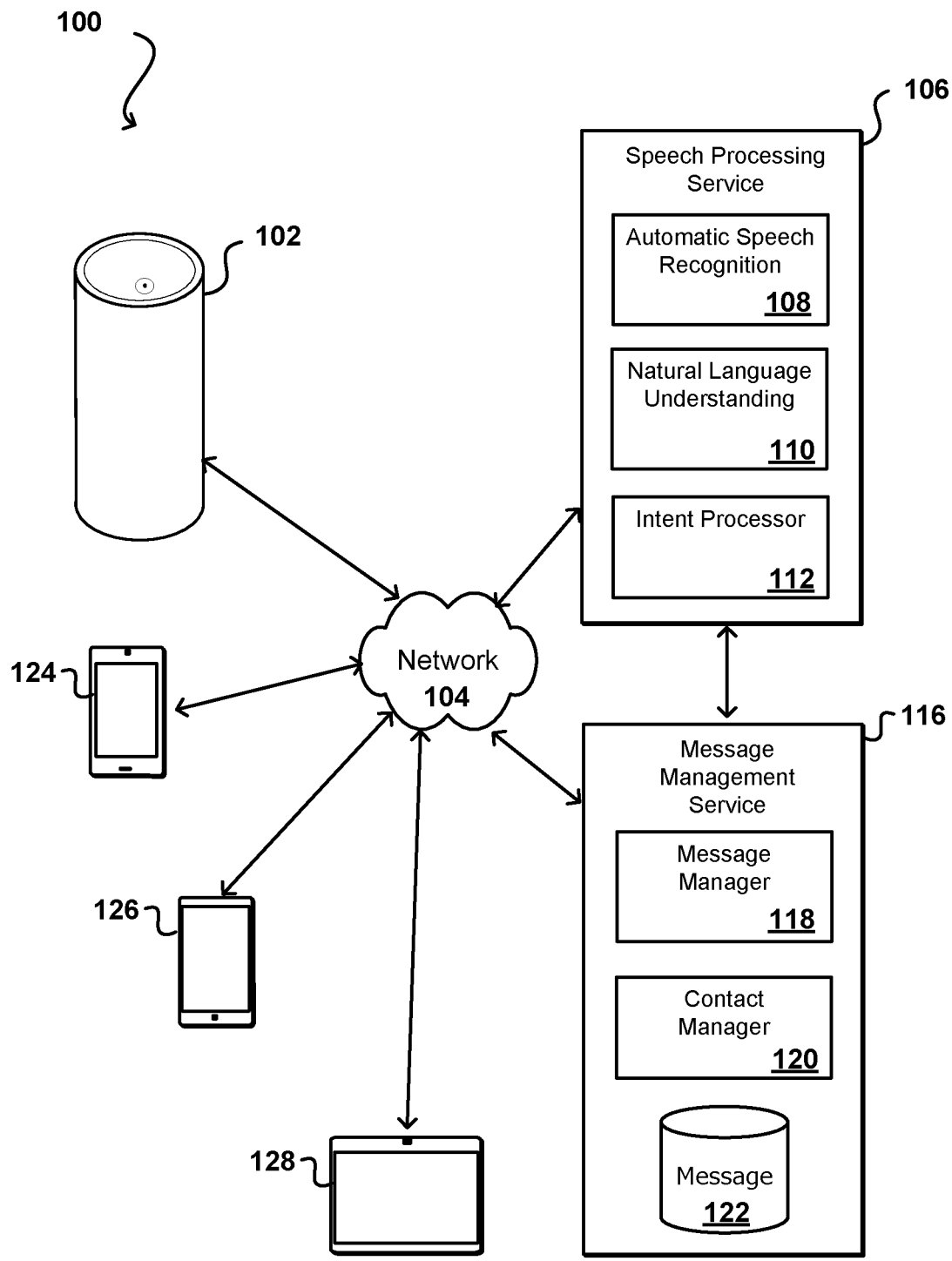
FIG. 1 illustrates an example system for sending messages to electronic devices that can be utilized in accordance with various embodiments.

FIG. 1 illustrates an example system 100 that can be utilized to route messages, or other such communications, among various electronic devices. Although a voice communications device 102 (e.g., an Amazon Echo) is shown communicating with portable devices 124, 126, 128 such as smart phones or tablet computers, it should be understood that various other types of electronic devices that are capable of receiving and processing communications can be used in accordance with various embodiments discussed herein. These devices can include, for example, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others.

A microphone, microphone array, or other signal capture component or system can capture an audio signal, such as a voice command, and perform at least some basic processing of the audio signal. For example, an application (e.g., a media service) executing on the voice communications device, or otherwise in communication with the voice communications device, can analyze the audio signal corresponding to a user's speech (also referred to herein as an utterance) that includes audio input data 106 to perform at least one function. The functions can include, for example, placing a call, answering a question, playing music, reading audiobooks, controlling connected devices via voice commands/instructions, or sending an electronic message (e.g., a text message or a voice message), among other such functions The voice communications device can be associated with a customer account provided by a service provider. The service provide can provide resources through a resource provider environment, which in this example can include a speech processing service 106 and/or a message management service 116. The customer account can include one or more profiles, e.g., one or more family member profiles or other profiles, where each profile can be associated with preferences, access rights, and other information, and may share certain account settings as may include payment information (same credit card), address, media content access types, etc. In the situation where one of the members desires to have an action performed, the member can activate the voice communications device, for example, using a wakeword (e.g., "Alexa"), and then speak the request or command. In some embodiments the member can announce his or her name in order to cause the device to load the appropriate member profile and corresponding preferences, access rights, and other such information. In various embodiments, rather than have a member announce a name, the voice communications device can automatically determine the member speaking using speech analysis software, logged in accounts, and the like. For example, an application executing on the voice communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with the speaking user, where the user has associated at least one contact with their user account. The contact can include any appropriate information, such as may include contact name, email address, IP address, contact identifier, account number, phone number, and the like. In response to the user speaking the phrase "Wakeword, send a message to Bob," audio input data that includes the phrase is received at the voice communications device 102 and an application executing on the voice communications device or otherwise in communication with the voice communications device can analyze the audio input data. For example, the contents of the audio input data can be streamed to a speech processing service 106 that can analyze the portions of the audio data upon receipt. In some embodiments, the backend server can begin processing one or more portions of the audio input data prior to the user having completed making the instructions. Thus, the speech processing service 106 can start analyzing whatever portion of the audio input data the service received through a variety of techniques such as automatic speech recognition (ASR) 108 and natural language understanding (NLU) 110 to convert the audio input data into a series of identifiable words, and then to analyze those words using a context interpreter or other such system or service to interpret the meaning of the request from the user. The speech processing service 106 can utilize the ASR 108 to recognize the spoken words that were recorded and stored in the audio data and to translate them into known text that can then be analyzed by the NLU 110 to attempt to decipher the meaning of the request from the user. Any suitable computer implemented speech-to-text converter can be used to convert the received audio signal(s) into text. In some embodiments, one or more filters may be applied to the received audio input data to reduce or minimize extraneous noise, however this is not required. The output of the NLU can be provided to an intent processor 112 to determine information such as the intent of the utterance, the intended recipient, and the like. In this example, analyzing the audio input data can include determining contact information "Bob" and an instruction or intent to "send a message." The speech processing service 106 can determine information from the user's contacts to identify information for Bob, and can then forward or send a request to a message management service 116 to send a message to a device associated with the identified Bob.

The example message management service 116 can utilize any appropriate messaging protocol, such as a multimedia messaging service (MMS), SIP, MSNP, or XMPP protocol, to deliver an audio message to a recipient, such as over one or more Internet Protocol (IP)-based networks. These protocols can define messages or communications that are sent between endpoints, such as may correspond to the voice communications device 102 and an end user device 124, 126, 128. When a message request is received to the message management service 116, that message can include information such as recipient information and message content. The message can also include, or be associated with, information that can be used to identify a sender of the message. This can include, for example, a user identifier or account number, among other such options. In some embodiments one or more user credentials might also be received with the messaging request in order to enable the request to be authenticated and determine that the requested message is authorized to be sent to the designated recipient(s). In this example the message request is received to a message manager 118, that can determine the specified recipient. Determining the recipient can include, for example, performing a search or lookup against a contact list for the user using at least one contact manager 120. The contact list can alternatively, or additionally, be associated with the voice communications device 102, a user account, a user profile, or a user role, among other such options and as discussed elsewhere herein. In at least some embodiments a user profile can be associated with multiple devices, and a separate device or communications profile. For example, a single user account can have multiple profiles, as may correspond to a mother, a father, and multiple children. Each profile can have its own restrictions and personalizations, among other such variations. Additionally, there can be communications profiles which can have a 1:1 relationship with a user profile or a 1:many relationship, such as where a group profile for a communal device might be correspond to every user in a household.

The contact manager can have access to at least one contacts list for the sending user, and can attempt to determine the appropriate recipient based on the target information received with the request. For example, if the spoken target is "Bob," then the contact manager 120 can perform a look up against a contact data store, for example, to attempt to identify with at least a minimum level of certainty or confidence a recipient corresponding to the target "Bob." If only a single contact matches "Bob" in the contact list for the user, then that recipient might be identified with 100% confidence. If, on the other hand, there are multiple potential Bob matches in the user contacts list, then additional information may be used to attempt to identify the appropriate recipient. This can include, for example, determining which Bob contacts the user has previously sent messages to, how recently the user has contacted each potential Bob match, a relationship of the sending user to each Bob, etc. In some embodiments the message management service 116 might also cause the voice communications device 102 to ask a follow up question of the user to identify the appropriate Bob contact. This can include, for example, asking for Bob's last name or full name, among other such options. Upon receiving a spoken answer, a similar process can be performed to determine the additional information to be used in identifying the appropriate recipient using the contact manager 120.

Once the appropriate contact information is determined, the message manager 118 can send a message to at least one address, destination, or device associated with the recipient. In some embodiments a notification can be sent to multiple devices which can then retrieve the message using a downloadable link or other such option. In other embodiments the message can be transmitted or pushed to one or more devices, such that the message is available on each device, among other such options. As described in more detail elsewhere herein, the message can include an audio portion that can be transmitted for playback on one or more electronic devices associated with the identified recipient(s). In some embodiments a text version of the message can also be transmitted or made available for viewing on one or more of these devices. In various embodiments a copy of the audio and/or text version can be stored to a message data store 122 or other such repository from which the version(s) can be retrieved. In some embodiments the message data will remain stored for at least a period of time, while in other embodiments the message data will remain stored until all recipients have deleted or taken another such action with respect to various links to the data, etc. In some embodiments the text data might be stored over time while the audio data might only be stored for a limited amount of time, among other such options. A user in some embodiments can listen to the audio version using various electronic devices, and can view the text version using various applications executing on those or other devices, etc.

Figure 2:
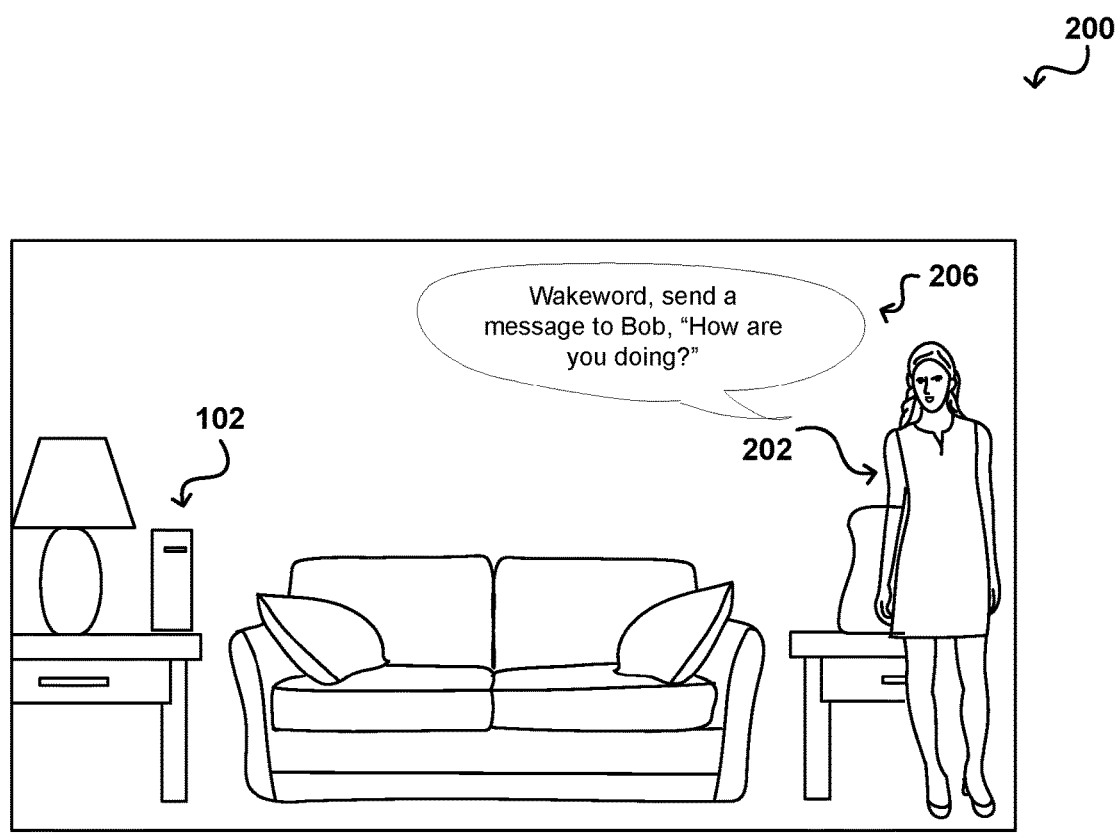
FIG. 2 illustrates an example environment in which a voice message request might be received in accordance with various embodiments.

FIG. 2 illustrates an example environment 200 in which a voice command 206 can be received to a voice communications device 102 in accordance with various embodiments. In this example, a user 202 will generate an utterance, or otherwise speak a voice command 206 that can be received by a voice communications device 102. The voice-enabled communications device 102 can include, for example, any device having a microphone or other component configured to generate audio data from received sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 202 can speak a request within an environment where the voice communications device 102 is located. The request may be any question, inquiry, instruction, phrase, or other set of one or more words/sounds. For example, the user may say, "Wakeword, send a message to Bob, How are you doing?" In this example, the word "Wakeword" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device 102 may begin interpreting/analyzing audio input data until no more speech is detected. In general, the voice communications device 102 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device 102 can be configured such that the device can record and store a limited amount of audio input data that should, in most instances, equal the amount of time needed to speak a sentence or more. Accordingly, even if a wakeword is recognized in the middle or end of a sentence, the voice communications device will have retained the entire sentence which can then be analyzed by backend servers to determine what is being requested. In this example, the voice communications device 102 will detect the wakeword in the utterance 206 and cause an amount of audio data to be recorded, that can then be analyzed on the device or, in at least some embodiments, uploaded to a speech processing service for analysis.

Figure 3:
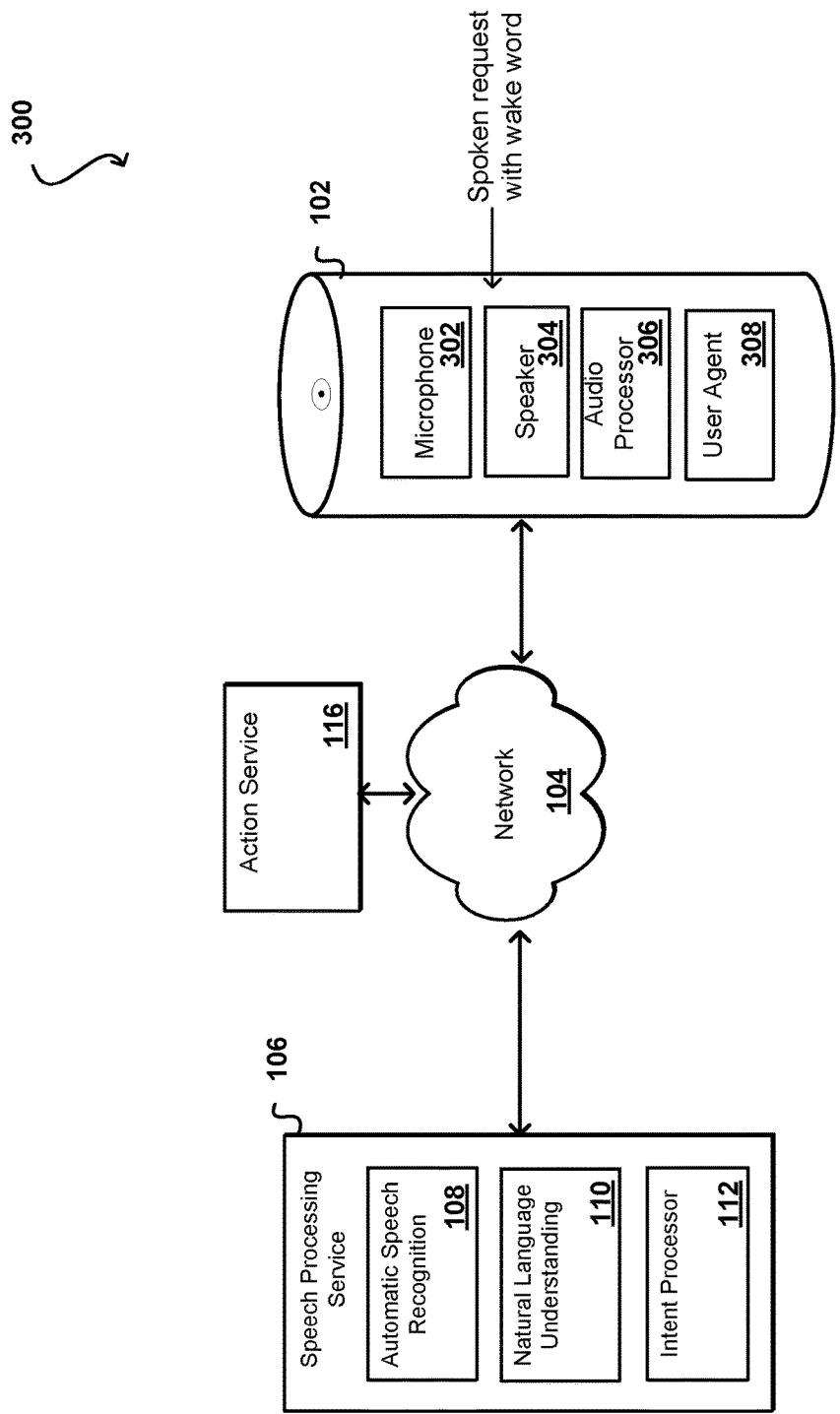
FIG. 3 illustrates an example system for processing a voice command or spoken request that can be utilized in accordance with various embodiments.

FIG. 3 illustrates a system 300 including a speech processing service 106 that can be utilized to process such audio data in accordance with various embodiments. The speech processing service 106 can be implemented using various hardware and software components, such as is described in more detail with respect to FIGS. 7 and 8. For example, components of the search processing service 106 are illustrated and described in more detail in the environment 700 of FIG. 7, which includes components such as automatic speech recognition 108, natural language understanding 110, text-to-speech 764, and various applications 762, among other such options. In this example, the system shows example data flows between a speech processing service 106, an action service 116, and a voice communications device 102 across at least one network 104. It should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In this example, a user may make an utterance, such as an utterance that includes a spoken command or request for the speech processing service 106 to perform some task, such as to send a message to an identified recipient. The user may speak the utterance into (or in the presence or proximity of) the voice communications device. The voice communications device 102 can correspond to a wide variety of electronic devices. In some embodiments, the voice communications device may be a computing device that includes one or more processors (such as may include at least one audio processor 306) and a memory which may contain software applications executed by the processor(s). The voice communications device 102 may include, or be in communication, with an audio input component for accepting speech input on which to perform speech recognition, such as a microphone 302. The voice communications device may also include, or be in communication with, an output component for presenting responses or other information from the speech processing service 106, such as a speaker 304. The functionality of the voice communications device can be implemented through a combination of hardware components and/or software for establishing communications over wireless communication networks or directly with other computing devices. In some embodiments the voice communications device 102 can also include a user agent 308 that enables the device to function as an endpoint for certain types of communications as discussed elsewhere herein.

The action service 116 can correspond to an online or electronic service that is able to receive requests to perform specific actions. As mentioned elsewhere herein, these actions can include tasks such as to send messages, establish communications, stream media, execute search queries, and the like. In many examples discussed herein, the action service 210 would correspond to a message or communication management service, or other such system or offering, although various other options could be implemented as well within the scope of the various embodiments.

The speech processing service 106 can receive a user utterance via the at least one network 104. The speech processing service 106 can be a network-accessible service in communication with the voice communications device 102 via the network, such as a cellular telephone network or the Internet as discussed elsewhere herein. A user may use the voice communications device 102 to submit utterances, receive information, and initiate various processes, either on the voice communications device 102 or at the speech processing service 106. For example, as described, the user can issue spoken commands to the voice communications device 102 in order to establish, alter, or otherwise manage a communications connection or call.

The speech processing service 106 may include an automatic speech recognition (ASR) module 108 that performs automatic speech recognition on audio data regarding user utterances, a natural language understanding (NLU) module 110 that performs natural language understanding on transcriptions generated by the ASR module 108, and an intent processor 112 that applies contextual rules to current NLU results based on prior interpretations and dialog acts, for example, in order to determine the intent and communicate with the message management service to determine the appropriate recipient.

The speech processing service 106 may include any number of server computing devices, desktop computing devices, mainframe computers, and the like. Each individual device may implement one of the modules or components of the speech processing service 106. In some embodiments, the speech processing service 106 can include several devices physically or logically grouped together to implement one of the modules or components of the speech processing service 106. For example, the speech processing service 106 can include various modules and components combined on a single device, multiple instances of a single module or component, etc. In one specific, non-limiting embodiment, the speech processing service 106 may include a server or group of servers configured with ASR and/or NLU modules 108, 110, a server or group of servers configured with a context interpreter and/or an intent processor 112, etc. In multi-device implementations, the various devices of the speech processing service 106 may communicate via an internal communication network, such as a corporate or university network configured as a local area network ("LAN") or a wide area network ("WAN"). In some cases, the devices of the speech processing service 106 may communicate over an external network, such as the Internet, or a combination of internal and external networks.

In some embodiments, the features and services provided by the speech processing service 106 may be implemented as web services consumable via a communication network. In further embodiments, the speech processing service 106 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing service 106 may be integrated into the voice communications device such that network connection and one or more separate computing systems are not necessary to perform the processes of the present disclosure. For example, a single voice communications device may include the microphone 104, the ASR module 108, the NLU module 110, an intent processor 112, or some combination thereof.

As described, users may submit utterances that may include various commands, requests, and the like. The microphone 302 may capture utterance audio and provide the audio (or data derived therefrom) to the speech processing service 106. The ASR module 108 may generate ASR results for the utterance, such as a w-best list of transcriptions. Each transcription or portion thereof may be associated with some score, such as a confidence score or a likelihood that the transcription or portion thereof is correct. The w-best list or some other type of results may be provided to the NLU module 110 so that the user's intent may be determined. A w-best list of interpretations (e.g., intents) may be determined or generated by the NLU module 110. A context interpreter portion of the NLU can process the NLU results (e.g., modify individual interpretations, filter interpretations, re-score or re-rank interpretations, etc.). The result can include call request information indicating a specific target for connection. In accordance with various embodiments, the result can be provided to the action service 116, such as a message management service 116 in FIG. 1, to attempt to establish the requested connection.

Figure 4A:
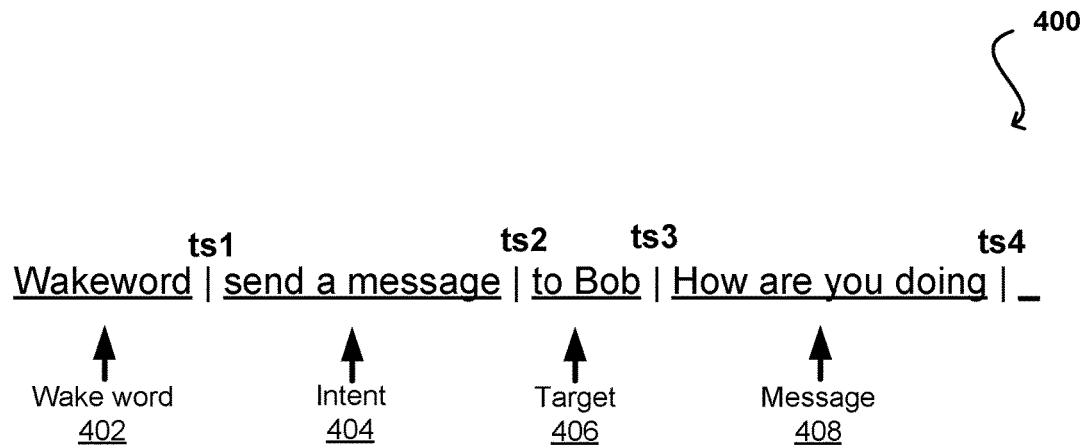
FIGS. 4A and 4B illustrate steps of an example audio message extraction and presentation approach that can be utilized in accordance with various embodiments.
Figure 4B:
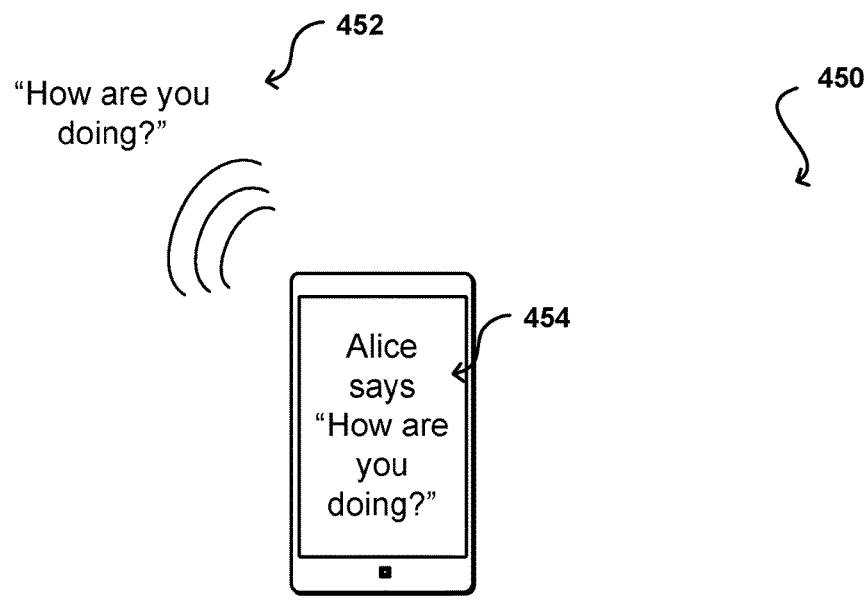

FIG. 4A illustrates an example segmentation 400 of input audio data that can be determined in accordance with various embodiments. As mentioned, the audio data can include at least one wakeword 402 that causes the voice communications device to capture audio data for processing. Although shown to be positioned near a starting point of the audio data, as mentioned elsewhere herein the wakeword may be positioned at other locations in the audio data as well. In this example, the location of the wakeword 402 in the audio data 400 can be determined, and a first timestamp (ts1) determined that corresponds to an end of the wakeword 402. The timestamp can be positioned at the end of the wakeword 402, at the beginning of the next word, or anywhere during the section or period of audio data there between. In some embodiments the wakeword may not be included in the audio data uploaded for processing where the voice communications device has the ability to determine and verify the presence of the wakeword and remove that portion from the audio data or only record data coming after the wakeword, among other such options.

The portion of the audio data not including the wakeword 402 can be analyzed to attempt to determine an intent 404 or action to be performed for the message. In this example the intent can be determined to be the word "send" or the phrase "send a message," among other such options. Other intents can be identified as well, such as "call," "play," or "find," etc. The ability to identify the intent can ensure that the appropriate action is taken and that the content of the audio data, as appropriate, is delivered to the appropriate system or service or otherwise processed accordingly. The ability to identify the intent can also identify the expected pattern for a remainder of the audio data, which can help to identify other portions of the audio data. For example, a messaging intent (or domain) can have a typical pattern that includes the terms "send" or "send a message," followed by a target and then a message. In the example audio data 400 of FIG. 4A, the target 406 can be identified as "Bob," or potentially "to Bob," with a remainder of the message being identified as the message payload 408 or contents. Because it can be desired to ensure that the entire spoken message payload is included, the audio data 400 may also include some amount of silence (or at least lack of spoken content) after the payload but before an end of the audio data clip. As indicated, at least one timestamp can be generated to identify the boundaries (or start/stop points) of each of these "slots" of the pattern in the audio data. In this example a first timestamp (ts1) indicates an end of the wakeword 402 and/or start of the intent 404 slot. A second timestamp (ts2) can indicate an end of the intent and beginning of the target 406 slot, and a third timestamp (ts3) can indicate a beginning of the payload or message 408 slot. A fourth timestamp (ts4)

may also be included to identify an end of the message portion, in order to prevent unnecessary processing of the "silent" portion proximate an end of the audio data. Thus, a set of timestamp data might be returned (relative to a beginning time of the audio data or a recorded system clock time, etc.) such as TS1=0.083, TS2=1.75, TS3=2.14, TS4=3.63. These timestamps can be used with the audio data to identify specific portions of the audio data. Thus, if it is desired to send the audio message portion to the target recipient, the audio data between the third and fourth timestamps can be extracted, potentially converted to an appropriate file format, and then transmitted as a message payload to the target recipient.

When at least one version of the message, or a notification of the message, is received to an electronic device 450 associated with the target recipient, the recipient can access the message content in one or more different ways. As mentioned, if the message includes a notification or locator then the device 450 might have to download or otherwise obtain the corresponding message payload. For at least some devices, the recipient can opt to listen to an audio version of the message by causing the device 450 to play an audio version 452 of the message as was extracted from the audio data. The recipient can also, or alternatively, view a text version 454 of the message through a messaging application executing (or page displaying) on the electronic device 450. While in some embodiments a text-to-speech module (not shown) can cause the text version of the message to be converted to computer-generated speech and provided for playback, in this example the device 450 can playback the actual audio message spoken by the sender, so the recipient can hear the words in the sender's voice, with the sender's inflections and emphasis that might not otherwise be provided by computer-generated speech.

Figure 5:
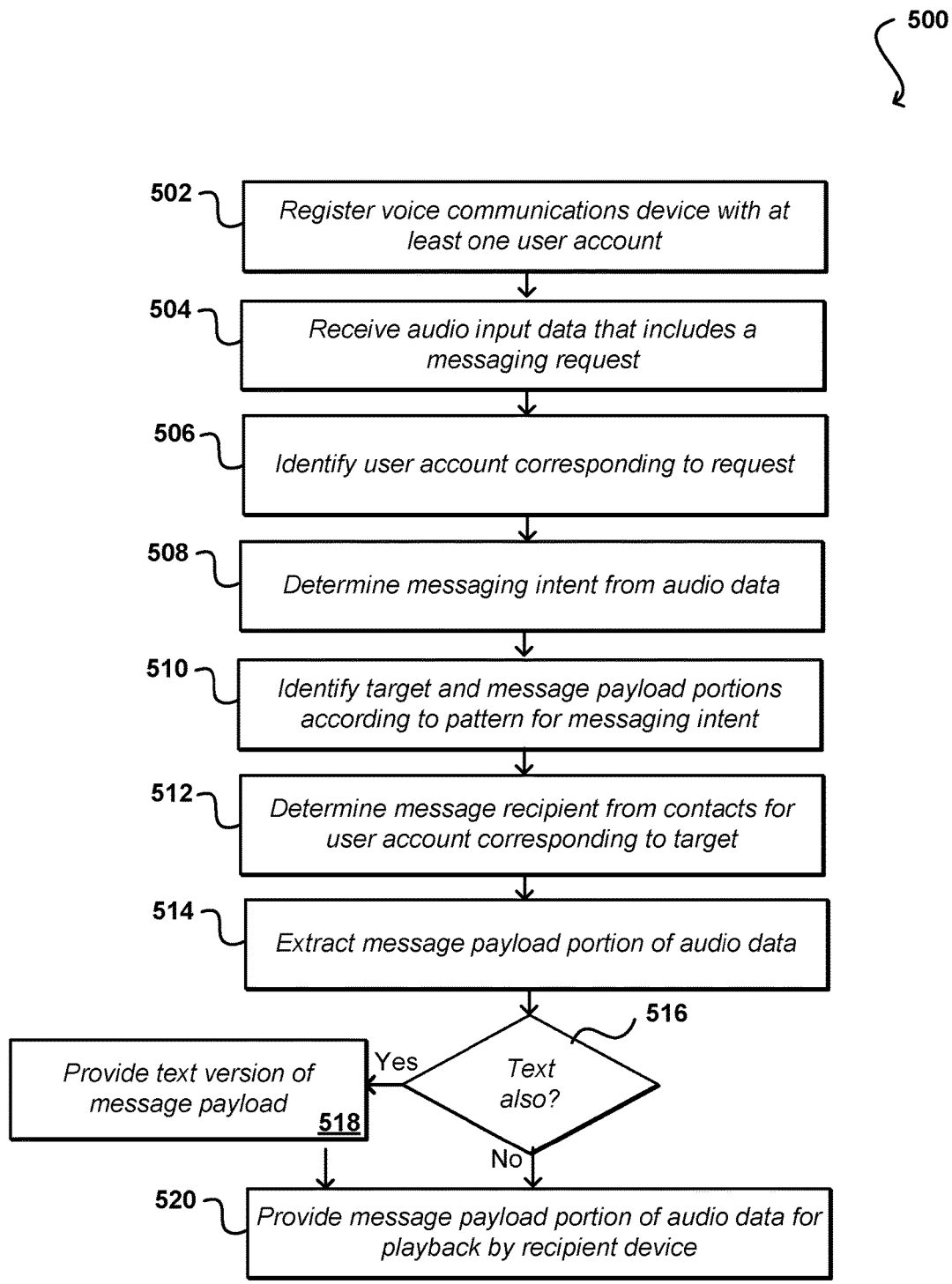
FIG. 5 illustrates an example process for sending a voice message in response to a received messaging request that can be utilized in accordance with various embodiments.

FIG. 5 illustrates an example process 500 for transmitting audio message data to a target recipient that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a voice communications device is registered 502 with at least one user account, as may correspond to an account with a service provider offering a service to analyze audio input data and perform one or more actions in response thereto. The ability to register the device with an account ensures that the proper device receives communications, ensures that the user or device is authorized to have the requested action performs, enables various data sources such as contacts lists and calendars to be associated with the device, and enables at least some amount of learning or customization based on interactions with users and devices of that account. In at least some embodiments, a device must be associated with a user account in order to have the audio input data (or other such input) processed by the service.

Once registered, audio input data can be received 504 that includes a messaging request. As mentioned, in at least some embodiments a request will be received that includes a segment of audio input data that may have been captured in response to the detection of a wakeword or other such command or instruction. In some embodiments there may have been some amount of pre-processing of the audio data on the voice communications device, while in other embodiments upon detection of a wakeword an amount of audio data will be captured until a significant pause in the voice data is detected, and that amount of audio data will then be uploaded or otherwise transmitted to the service. Various other approaches can be used as discussed and suggested elsewhere herein. In some embodiments audio data might be streamed or sent in snippets during the audio capture, such that a single transmission after completion of the spoken utterance is not required. In response to receiving the request, the user account associated with the request can be determined. This can be based upon an account number, user identifier, or device identifier associated with the request, among other such options. In some embodiments one or more other credentials, such as an access token or key, might be provided for purposes of authentication as well. As mentioned, the account can be verified and any authentication performed before the audio data is processed. Once any authentication or verification is completed successfully, the request can be processed accordingly. In situations where a device is shared amongst multiple users, the appropriate user can be identified through various processes, such as through voice recognition, through the user stating their name as part of the utterance, through the currently logged in user, etc. This can not only affect sender information, but can also determine the appropriate contacts list or other information to utilize for the request.

In this example a messaging intent is determined 508 from the audio data. As discussed herein, a "messaging" intent is not limited to sending a voice message, but can also include providing a snippet of voice data (or other such information) for other purposes as well, such as to provide instructions to a user or service, take a note for future reference, provide an answer to a provided question, and the like. Such a process can include analyzing the audio data using one or more language processing approaches to detect a word or phrase, such as "send" or "send a message," in an appropriate location in the audio data. Further detail is provided with respect to the example process 600 of FIG. 6. As discussed, the ability to determine the messaging intent helps to determine the type(s) of information to be identified from the audio data. For a messaging example, this can include identifying 510 the target and message payload portions of the audio data. In one example, the target of the message could be "Bob," where the user utterance included a phrase such as "send a message to Bob." As mentioned, the pattern of slots for the messaging intent, along with the natural language understanding of the words represented in the audio data, can be used to determine the target and payload. The actual message recipient can then be determined 512 based on the target data, such as by performing a lookup in a contacts list for the associated user account. The recipient data can take the form of a user identifier, device identifier, address, or other such identifier to which the message should be sent or a notification or the message should be provided, among other such options. The message payload of the audio data can also be extracted 514, such as by using a pair of timestamps to identify the message portion and generate a file or object including only that portion of the audio data. In some embodiments both text and audio versions of the message may be available. If it is determined 516 that text should also be available, then a text version of the message payload can be provided 518 for access by the intended recipient(s). The text version can be generated using the text analysis performed previously as part of the audio data analysis. The text version can be transmitted with the message or available for access through an application or other such approach. The message payload portion of the audio data can be provided 520 for playback by at least one appropriate recipient device associated with the target recipient(s). In some embodiments a recipient can have the option of viewing the text version or listening to the audio version, or both. As mentioned, in some embodiments one or more versions will be pushed to an identified address, device, or location, while in other embodiments a notification will be provided that will enable a user to download or otherwise obtain the message payload, among other such options.

Figure 6:
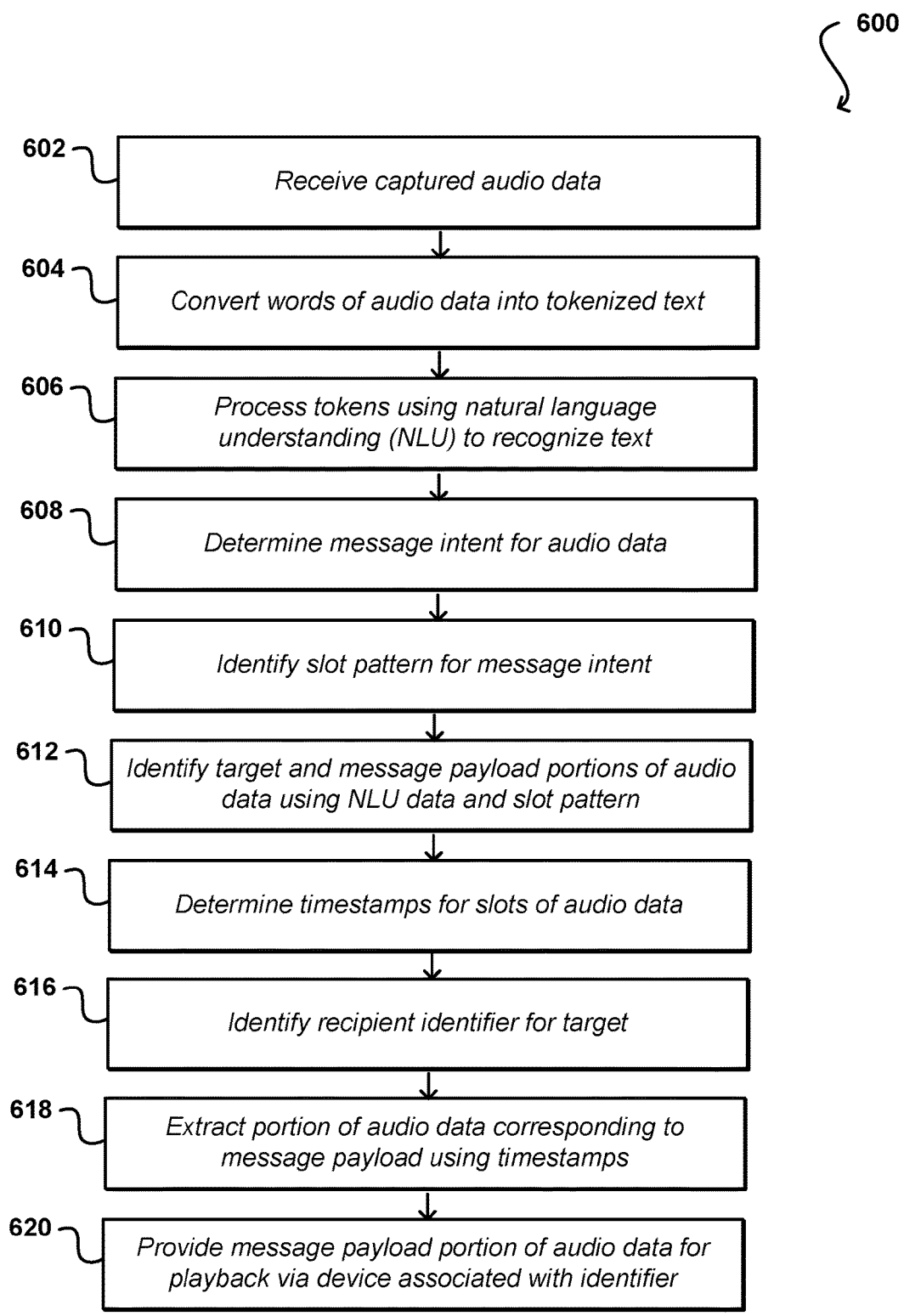
FIG. 6 illustrates an example process for extracting the audio message from a spoken messaging request that can be utilized in accordance with various embodiments.

FIG. 6 illustrates an example process 600 for analyzing the audio data to determine information such as the intent and target that can be utilized in accordance with various embodiments. In this example, audio data captured by a voice communications device, or other such mechanism, is received 602, such as to a speech processing service or other such system. In this example, the audio data is analyzed to identify and convert 604 the words represented in the audio data into tokenized text. This can include, for example, processing the audio data using an automatic speech recognition (ASR) module that is able to recognize human speech in the audio data and then separate the words of the speech into individual tokens that can be sent to a natural language understanding (NLU) module, or other such system or service. The tokens can be processed 606 by the NLU module to attempt to determine a slot or purpose for each of the words in the audio data. For example, the NLU module can attempt to identify the individual words, determine context for the words based at least in part upon their relatively placement and context, and then determine various purposes for portions of the audio data. For example, the NLU can process the words "send a message" together to identify this as an intent for the audio data. There can be variations to such an intent, but words such as "send" can function as a primary trigger word, for example, which can cause the NLU module to look for related words that are proximate the trigger word in the audio data. Variations can include phrases like "send a text message" or "send a voice message," among other such options. Other variations such as "send an image" or "send a reminder" may also utilize the same trigger word, such that the NLU may need to utilize context, machine learning, or other approaches to properly identify the intent.

Using this or other technology discussed or suggested herein, the message intent can be determined 608 for the audio data. As mentioned, once the message intent is determined then a messaging "domain" can be used to process the audio data, where the domain determines the patterns, libraries, slot criteria, or other aspects or functionality that are applicable to messaging requests. For this domain, the slot pattern for the message intent can be determined 610. As mentioned, this can include the intent, followed by the target, followed by the message payload, among other such options. Using the NLU-processed data and the slot pattern, the target and message portions of the audio data can be identified 612. The determination of the start and end points for these slots enables a set of timestamps to be determined 614 that correspond to those points in the data. The words of the target slot can be analyzed to identify 616 the recipient of the message as discussed previously. The timestamps can also be used to identify and extract 618 the payload portion of the audio data corresponding to the message. This can include, for example, cropping or trimming the audio data to the payload portion, copying the payload portion to a new file or object of an appropriate format (e.g., an Opus or MP3 file), or another such action. The trimming approach can vary between embodiments, but in one embodiment a fixed bit rate audio codec can be used such that the appropriate location in the file can be determined based upon the provided timestamp data. The message payload portion can then be provided 620 for playback via an electronic device associated with the recipient identifier. As mentioned, this can include a transmission or notification of the audio payload, among other such options.

In at least one embodiment the entire file of audio data for a recorded utterance is stored to a temporary location, which can be a general location or a location associated with the messaging domain, among other such options. A custodian service or other such system can manage access and security for the stored audio data. In some embodiments the audio data may be stored by the domain for a period of time, such as a day, after which at least the local copy may be purged. As mentioned elsewhere herein, a text copy of the utterance might be stored in perpetuity for the user account, in some embodiments for both the sender and each recipient. The text file may undergo some processing in some embodiments in order to perform functions such as to correct grammar, add capitalization and punctuation, ensure proper spelling, etc. In some embodiments the message payload audio portion will be converted to a compressed format, such as an MP3 format, and then stored or archived for access via the user account. If multiple recipients (or senders) are associated with that message, then the message payload audio may remain stored until all callers and/or recipients indicate that the file should be deleted.

In some embodiments video data can be captured as well as, or instead of, audio data. A camera might continually be recording to detect a wakeword or wake gesture, but since this can be very processor intensive the camera might operate in a low resolution or low color mode to attempt to detect specific motions or gestures. In other embodiments the device might include a motion sensor or other such component to determine when to activate a camera on the device. Otherwise, the general process can be similar After detecting a wakeword or gesture, the audio and video data can be captured and transmitted for analysis. The audio (or video) can be analyzed to determine the appropriate intent, then the message broken up by the appropriate slots for that intent. The message payload portion of the media file can then be transmitted or otherwise provided for playback by a recipient device. In some embodiments the camera can capture and buffer an amount of video, such that if a user is interested in something that just happened the user can issue an utterance such as "send what just happened to my device" or "send a message to Alice showing what just happened."

It should also be pointed out that, as mentioned elsewhere herein, advantages of the various embodiments do not apply only to messaging intents, but can apply to other intents or types of actions as well. For example, a user might speak an utterance such as "Wakeword, take a note, remember to pick up milk" and the utterance can be analyzed to determine the note taking intent, and can store an audio note "remember to pick up milk" for subsequent playback, such as through a car audio system or smart watch, etc. A user might also provide an utterance such as "Wakeword, place an order with pizza place, one large pepperoni with onions and extra cheese." The audio message data might be transmitted instead of a translated text version if the recipient would rather hear the way the customer ordered in order to determine any inferences or other inflections that might help ensure the order is correct." The analysis and/or action can also be performed by a third party or remote service, among other such options. A user or third party can potentially also provide different intents and intent patterns that can be used when processing audio data captured for such utterances.

Figure 7:
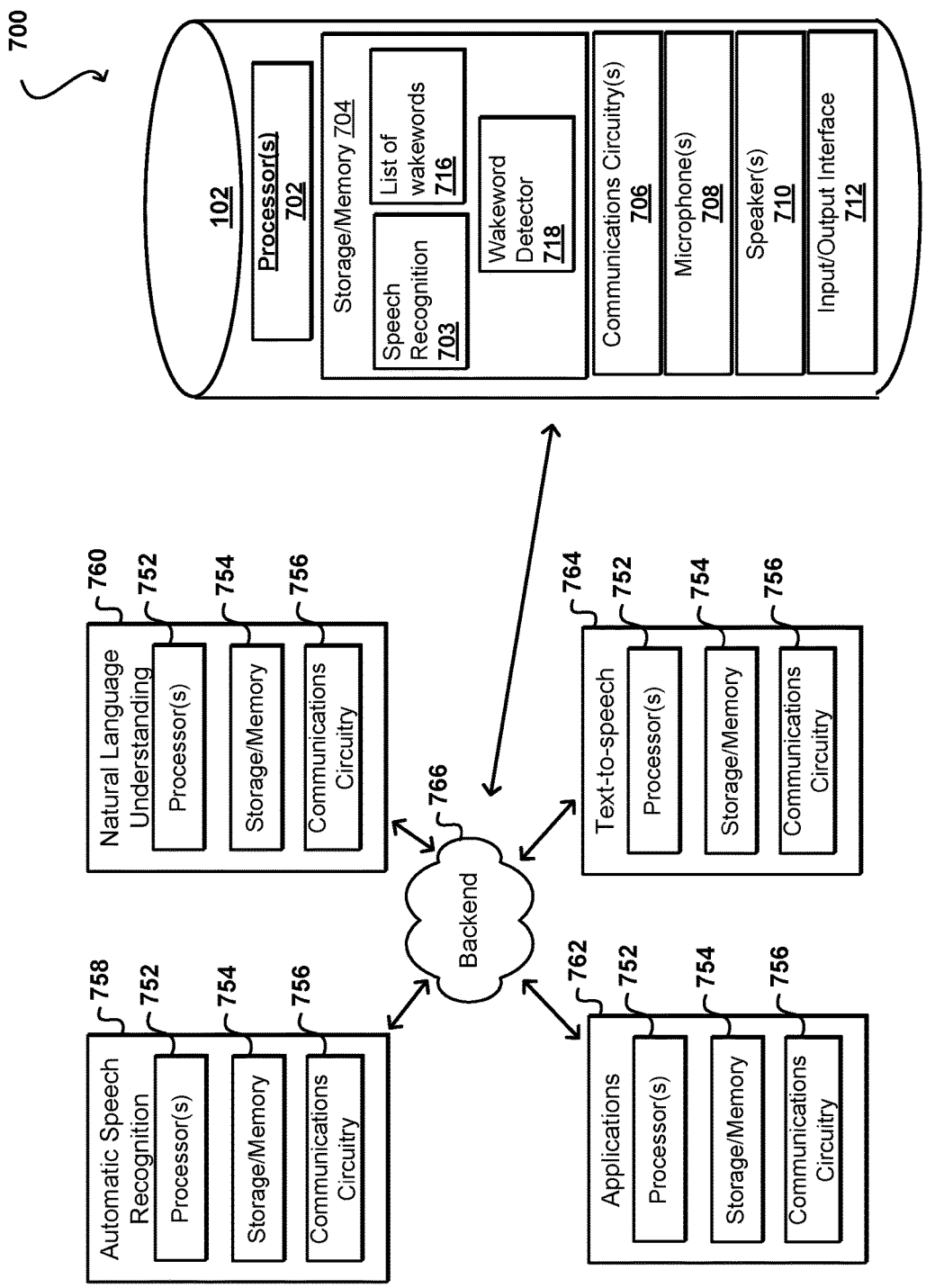
FIG. 7 illustrates an example voice processing system that can be utilized in accordance with various embodiments.

FIG. 7 is another example environment 700 for implementing aspects in accordance with various embodiments. In this example, voice-enabled communications device 102, in some embodiments, may correspond to any type of electronic device capable of being activated in response to detecting a specific sound. Voice-enabled comunications device 102 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled comunications device 102 may be relatively simple or basic in structure such that no mechanical input option(s) (e.g., keyboard, mouse, trackpad) or touch input(s) (e.g., touchscreen, buttons) may be provided. For example, voice-enabled comunications device 102 may be capable of receiving and outputting audio, and may include power, processing capabilities, storage/memory capabilities, and communication capabilities.

Voice-enabled comunications device 102 may include a minimal number of input mechanisms, such as a power on/off switch, however primary functionality, in one embodiment, of voice-enabled comunications device 102 may solely be through audio input and audio output. For example, voice-enabled comunications device 102 may listen for a wakeword by continually monitoring local audio. In response to the wakeword being detected, voice-enabled comunications device 102 may establish a connection with backend server 1008, send audio input data to backend server 1008, and await/receive a response from backend server 1008. In some embodiments, however, non-voice-enabled devices may also communicate with backend server 1008 (e.g., push-to-talk devices).

Voice-enabled comunications device 102 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice-enabled comunications device 102, and/or one or more components may be omitted. For example, voice-enabled comunications device 102 may include a power supply or a bus connector. As another example, voice-enabled comunications device 102 may not include a visual I/O interface. Furthermore, while multiple instances of one or more components may be included within voice-enabled comunications device 102, for simplicity only one of each component has been shown.

Processor(s) 702 may include any suitable processing circuitry capable of controlling operations and functionality of voice-enabled comunications device 102, as well as facilitating communications between various components within voice-enabled comunications device 102. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("AS-SPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice-enabled comunications device 102, and/or one or more firmware applications, media applications, and/or applications resident thereon.

Storage/memory 704 may include one or more types of storage mediums such as any volatile or non-volatile memory, or any removable or non-removable memory implemented in any suitable manner to store data on voice-enabled comunications device 102. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704.

In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 708 for processing.

List of wakewords database 716 may be a database stored locally on voice-enabled comunications device 102 that includes a list of a current wakeword for voice-enabled comunications device 102, as well as one or more previously used, or alternative, wakewords for voice-enabled comunications device. In some embodiments, user 102 may set or program a wakeword for voice-enabled comunications device 102. The wakeword may be programmed directly on voice-enabled comunications device 102, or a wakeword or words may be set by the individual via a backend server application (app) that is in communication with backend server 708. For example, a user may use their mobile device having the backend server application running thereon to set the wakeword. The specific wakeword may then be communicated from the mobile device to backend server 708, which in turn may send/notify voice-enabled comunications device 102 of the individual's selection for the wakeword.

The selected activation may then be stored in list of wakewods database 716 of storage/memory 704.

Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled comunications device 102 may then begin sending the audio signal to backend server 708 for detecting and responds to subsequent utterances made by a user.

Communications circuitry 706 may include any circuitry allowing or enabling voice-enabled comunications device 102 to communicate with one or more devices, servers, and/or systems. For example, communications circuitry 706 may facilitate communications between voice-enabled comunications device 102 and backend server 708. Communications circuitry 706 may use any communications protocol, such as any of the previously mentioned exemplary communications protocols. In some embodiments, voice-enabled comunications device 102 may include an antenna to facilitate wireless communications with a network using various wireless technologies (e.g., Wi-Fi, Bluetooth, radiofrequency, etc.). In yet another embodiment, voice-enabled comunications device 102 may include one or more universal serial bus ("USB") ports, one or more Ethernet or broadband ports, and/or any other type of hardwire access port so that communications circuitry 706 allows voice-enabled comunications device 102 to communicate with one or more communications networks.

Voice-enabled comunications device 102 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice-enabled comunications device 102 may include multiple microphones (e.g., four, seven, ten, etc.) placed at various positions about voice-enabled comunications device 102 to monitor/capture any audio outputted in the environment where voice-enabled comunications device 102 is located. The various microphones 708 may include some microphones optimized for distant sounds, while some microphones may be optimized for sounds occurring within a close range of voice-enabled comunications device 102.

Voice-enabled comunications device 102 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice-enabled comunications device 102 may be located. In some embodiments, speaker(s) 710 may include headphones or ear buds, which may be wirelessly wired, or hard-wired, to voice-enabled comunications device 102, that may be capable of broadcasting audio.

In some embodiments, one or more microphones 708 may serve as input devices to receive audio inputs, such as speech. Voice-enabled comunications device 102, may then also include one or more speakers 710 to output audible responses. In this manner, voice-enabled comunications device 102 may function solely through speech or audio, without the use or need for any input mechanisms or displays.

In one exemplary embodiment, voice-enabled comunications device 102 includes I/O interface 712. The input portion of I/O interface 712 may correspond to any suitable mechanism for receiving inputs from a user of voice-enabled comunications device 102. For example, a camera, keyboard, mouse, joystick, or external controller may be used as an input mechanism for I/O interface 712. The output portion of I/O interface 712 may correspond to any suitable mechanism for generating outputs from voice-enabled comunications device 102. For example, one or more displays may be used as an output mechanism for I/O interface 712. As another example, one or more lights, light emitting diodes ("LEDs"), or other visual indicator(s) may be used to output signals via I/O interface 712 of voice-enabled comunications device 102. In some embodiments, one or more vibrating mechanisms or other haptic features may be included with I/O interface 712 to provide a haptic response to user 102 from voice-enabled comunications device 102. Persons of ordinary skill in the art will recognize that, in some embodiments, one or more features of I/O interface 712 may be included in a purely voice-enabled version of voice communications device 102. For example, one or more LED lights may be included on voice-enabled comunications device 102 such that, when microphone(s) 708 receive audio from user 102, the one or more LED lights become illuminated signifying that audio has been received by voice-enabled comunications device 102. In some embodiments, I/O interface 712 may include a display screen and/or touch screen, which may be any size and/or shape and may be located at any portion of voice-enabled comunications device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 7 also includes backend server 766, as mentioned previously, which may be in communication with voice-enabled comunications device 102. Backend server 766 includes various components and modules including, but not limited to, automatic speech recognition ("ASR") module 108 (which may include, for example, speech-to-text ("STT") functionality), natural language understanding ("NLU") module 110, applications module 762, and text-to-speech ("TTS") module 764. In some embodiments, backend server 766 may also include computer readable media, including, but not limited to, flash memory, random access memory ("RAM"), and/or read-only memory ("ROM"). Backend server 766 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 108 may be configured such that it recognizes human speech in detected audio, such as audio captured by voice-enabled comunications device 102, which is then sent to backend server 766. ASR module 108 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 110 may be configured such that it determines user intent based on the detected audio received from voice-enabled comunications device 102. NLU module 110 may include processor(s) 752, storage/memory 754, and communications circuitry 756.

Applications module 762 may, for example, correspond to various action specific applications or servers capable of processing various task specific actions. Applications module 762 may further correspond to first party applications and/or third party applications operable to perform different tasks or actions. For example, based on the context of audio received from voice-enabled comunications device 102, backend server 766 may use a certain application to perform an action, such refining an active play queue of media content. Applications module 762 may include processor(s) 752, storage/memory 754, and communications circuitry 756. As an illustrative example, applications module 762 may correspond to a media service. The electornic media service application of the applications module 762 can be associated with a customer account. The customer account can include at least one profile stored in, for example, user information that can be linked to the electronic media service application in applications module 762. Audio input data can be received at automatic speech recognition module 108 from voice communications device 102. The automatic speech reconition module 108 can use automatic speech recognition (ASR) techniques on the audio input data to generate text data of the audio input data. The natural language understanding module 110 can use natural language understanding (NLU) techniques on the text data to determine refinement/attribute information to manage the active play queue. The electronic media service application of the applications module 762 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 108, NLU module 110, applications module 762, and TTS module 764 include instances of processor(s) 752, storage/memory 754, and communications circuitry 756, those instances of processor(s) 752, storage/memory 754, and communications circuitry 756 within each of ASR module 108, NLU module 110, applications module 762, and STT/TTS module 764 may differ. For example, the structure, function, and style of processor(s) 752 within ASR module 108 may be substantially similar to the structure, function, and style of processor(s) 752 within NLU module 110, however the actual processor(s) 752 need not be the same entity.

In accordance with various embodiments, different approaches can be implemented in various environments in accordance with the described embodiments. For example, FIG. 10 illustrates an example of an environment 800 for implementing aspects in accordance with various embodiments. As will be appreciated, although a Web-based environment is used for purposes of explanation, different environments may be used, as appropriate, to implement various embodiments. The system includes voice communications device 102, which can include any appropriate device operable to send and receive requests, messages or information over network 804 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the voice communications device 102 and the backend server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 8:
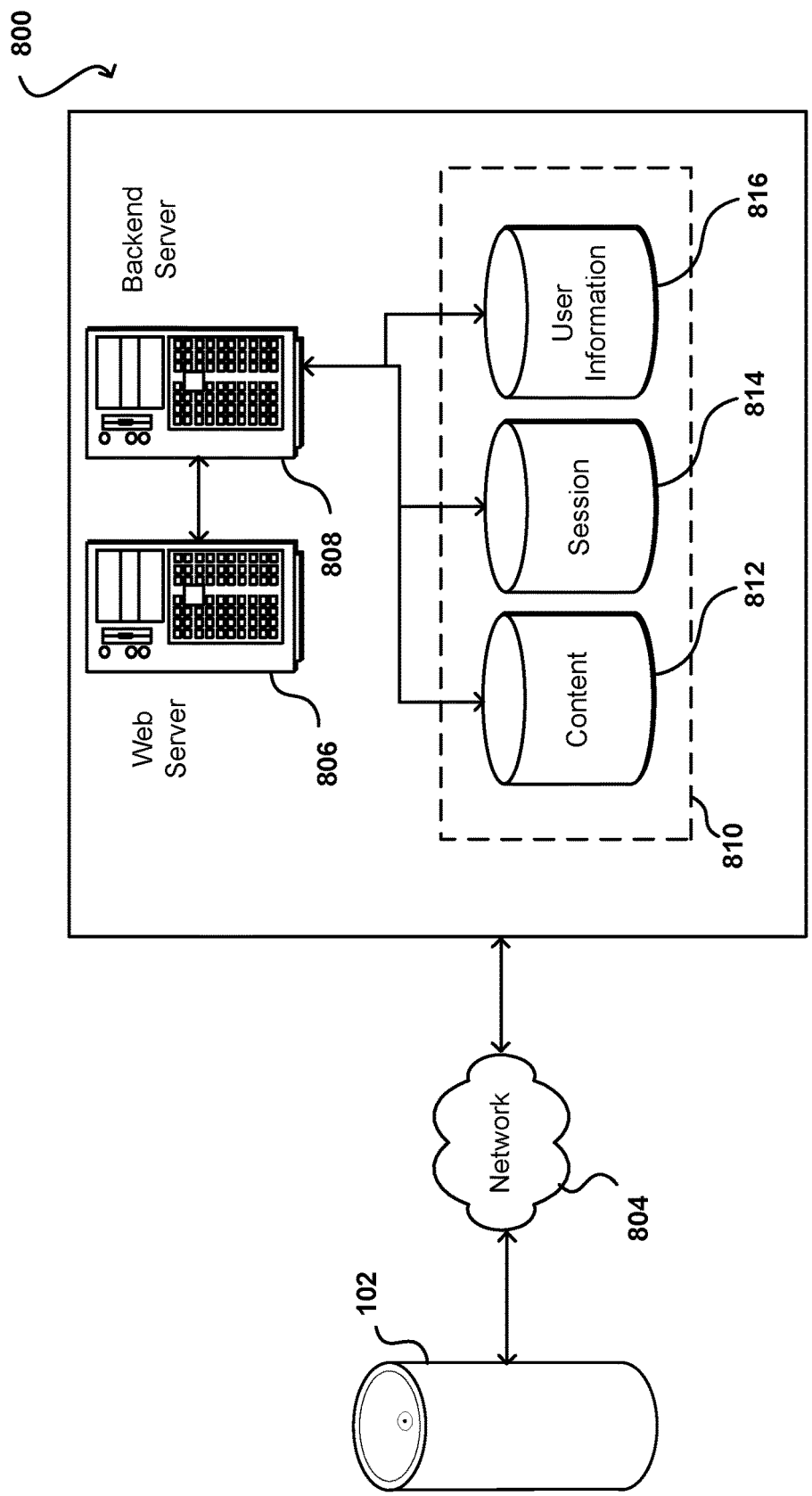
FIG. 8 illustrates an example environment in which various embodiments can be implemented.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a non-transitory storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one device processor;
   memory including instructions that, when executed by the at least one device processor, cause the system to:
   receive audio input data from a voice communications device associated with an account, the audio input data corresponding to an utterance received by a microphone of the voice communications device, wherein a beginning of the utterance is identified by the voice communications device in response to a wakeword being detected by the voice communications device;
   generate text data from the audio input data by performing automated speech recognition (ASR) on the audio input data;
   determine, from the text data, a messaging intent by performing natural language processing (NLP) on the text data;
   determine a slot pattern corresponding to the messaging intent, the slot pattern including at least a target slot and a message payload slot;
   determine respective portions of the text data that correspond to the target slot and the message payload slot;
   identify, based upon the text data corresponding to the target recipient slot and a contact list associated with the voice communications device, a recipient identifier;
   determine a first timestamp associated with the message payload slot;
   generate, based upon the first timestamp, audio message data including a portion of the audio data corresponding to the text data of the message payload slot; and
   send the audio message data for playback on an audio playback device associated with the recipient identifier.

2. The system of claim 1, wherein the instructions, when executed further cause the system to:
   determine a second timestamp corresponding to an end location of the message payload slot; and
   include only a portion of the audio input data located between a time of the first timestamp and a time of the second timestamp in the audio message data.

3. The system of claim 1, wherein the instructions, when executed further cause the system to:
   determine message text corresponding to the audio message data; and
   transmit the message text for access via the recipient identifier, wherein the message text is able to be presented with, or separate from, the audio message data.

4. The system of claim 1, wherein the instructions, when executed further cause the system to:
   receive a request from the audio playback device to an address corresponding to the audio message data; and
   send the audio message data for playback on the audio playback device in response to the request.

5. A computer-implemented method, comprising:
receiving audio input data corresponding to an utterance received by at least one microphone of a voice communications device associated with an account, wherein a beginning of the utterance is identified by the voice communications device in response to a wakeword being detected by the voice communications device;
determining a messaging intent represented by the audio input data;
determining a slot pattern corresponding to the messaging intent, the slot pattern including at least a target slot and a message payload slot;
determining, from the target slot, a recipient identifier represented by the audio input data;
determining a message payload portion that corresponds to the message payload slot;
determining a first time stamp identifying a beginning of the message payload portion; and
generating, for playback on an audio playback device and accessible according to the recipient identifier, audio message data including the message payload portion starting from a location of the first time stamp in the audio input data.

6. The computer-implemented method of claim 5, further comprising:
determining a set of time stamps identifying locations of the target slot and the message payload slot, the set of time stamps including the first time stamp; and
determining the recipient identifier and the message payload portion based upon the locations of the set of time stamps with respect to the audio input data.

7. The computer-implemented method of claim 5, further comprising:
generating tokenized text data from the audio input data by performing automated speech recognition (ASR) on the audio input data.

8. The computer-implemented method of claim 7, further comprising:
determining at least the messaging intent, and respective words corresponding to the target slot and the message payload slot, by performing natural language processing (NLP) on the tokenized text data.

9. The computer-implemented method of claim 5, further comprising:
determining, for the audio input data, an identity of a user having spoken the utterance; and
determining a contact list for the user based upon the identity; and
determining the recipient identifier based upon performing a lookup of a target from the target slot against the contact list for with the user.

10. The computer-implemented method of claim 5, further comprising:
receiving media input data including the audio input data and corresponding video input data; and
extracting the audio input data for determining the messaging intent.

11. The computer-implemented method of claim 10, further comprising:
including, for playback, a portion of the video input data corresponding to the message payload portion.

12. The computer-implemented method of claim 5, further comprising:
determining that the recipient identifier is unable to be determined with at least a minimum level of confidence based on the audio input data;
causing additional audio input data to be received that includes additional identifying information for a target of the messaging intent; and
determining the recipient identifier based upon the additional identifying information.

13. The computer-implemented method of claim 5, further comprising:
determining message text corresponding to the message payload slot; and
providing the message text for access via the recipient identifier, wherein the message text is able to be presented with, or separate from, the audio message data.

14. A system, comprising:
at least one device processor;
memory including instructions that, when executed by the at least one device processor, cause the system to:
receive media input data corresponding to an utterance received by a communications device associated with an account, wherein a beginning of the utterance is identified by the communications device in response to a wakeword being detected by the communications device;
extract audio input data from the media input data;
determine a messaging intent represented by the audio input data;
determine a slot pattern corresponding to the messaging intent, the slot pattern including at least a target slot and a message payload slot;
determine a recipient identifier represented by the audio input data;
determine a message payload portion that corresponds to the message payload slot;
determine a first time stamp identifying a beginning of the message payload portion; and
generate, for playback on a playback device and accessible according to the recipient identifier, media message data including the message payload portion starting from a location of the first time stamp in the audio input data.

15. The system of claim 14, wherein the instructions, when executed further cause the system to:
determine a set of time stamps identifying locations of the target slot and the message payload slot in the audio input data; and
determine the recipient identifier and the message payload portion based upon the locations of the set of time stamps with respect to the audio input data.

16. The system of claim 14, wherein the instructions, when executed further cause the system to:
generate tokenized text data from the audio input data by performing automated speech recognition (ASR) on the audio input data; and
determine at least the messaging intent, and respective words corresponding to the target slot and the message payload slot, by performing natural language processing (NLP) on the tokenized text data.

17. The system of claim 14, wherein the instructions, when executed further cause the system to:
determine, for the media input data, an identity of a user having spoken the utterance; and
determine a contact list for the user based upon the identity; and
determine the recipient identifier based upon performing a lookup of a target from the target slot against the contact list for with the user.

18. The system of claim 14, wherein the instructions, when executed further cause the system to:

determine that the recipient identifier is unable to be determined with at least a minimum level of confidence based on the audio input data;

cause additional audio input data to be received that includes additional identifying information for a target of the messaging intent; and determine the recipient identifier based upon the additional identifying information.

19. The system of claim 14, wherein the instructions, when executed further cause the system to:

extract video input data from the media input data; and include, for playback on the playback device, a portion of the video input data corresponding to the message payload portion.

* * * * *